United States Patent
Jesudoss et al.

(10) Patent No.: US 9,321,254 B2
(45) Date of Patent: Apr. 26, 2016

(54) ARTICLE AND METHOD OF MAKING AND USING THE SAME

(75) Inventors: Arokiaraj Jesudoss, Singapore (SG);
Ranjith Divigalpitiya, London (CA);
Gary A. Korba, Woodbury, MN (US);
Boon Kiat Lim, Singapore (SG); Melvin T. Zin, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 9 days.

(21) Appl. No.: 13/880,820

(22) PCT Filed: Dec. 2, 2011

(86) PCT No.: PCT/US2011/063064
§ 371 (c)(1),
(2), (4) Date: Apr. 22, 2013

(87) PCT Pub. No.: WO2012/078464
PCT Pub. Date: Jun. 14, 2012

(65) Prior Publication Data
US 2013/0244009 A1  Sep. 19, 2013

Related U.S. Application Data

(60) Provisional application No. 61/421,017, filed on Dec. 8, 2010.

(51) Int. Cl.
| | |
|---|---|
| *C23C 26/00* | (2006.01) |
| *B41C 1/00* | (2006.01) |
| *B41J 2/005* | (2006.01) |
| *B82Y 40/00* | (2011.01) |

(Continued)

(52) U.S. Cl.
CPC . *B41C 1/00* (2013.01); *B41J 2/005* (2013.01); *B82Y 30/00* (2013.01); *B82Y 40/00* (2013.01); *C01B 31/0484* (2013.01); *Y10T 428/24802* (2015.01)

(58) Field of Classification Search
CPC .... B41J 2/005; B41C 1/00; Y10T 428/24802; C01B 31/0484
USPC .......................................................... 427/11
See application file for complete search history.

(56) References Cited

U.S. PATENT DOCUMENTS

| | | | |
|---|---|---|---|
| 5,389,195 A | 2/1995 | Ouderkirk | |
| 5,972,176 A | 10/1999 | Kirk | |

(Continued)

FOREIGN PATENT DOCUMENTS

| | | |
|---|---|---|
| CN | 101648182 | 2/2010 |
| WO | WO 01-76770 | 10/2001 |

(Continued)

OTHER PUBLICATIONS

Novoselov et al. Two-dimensional atomic crystals, Jul. 26, 2005, PNAS, vol. 102 No. 30, pp. 10451-10453.*

(Continued)

*Primary Examiner* — Kelly M Gambetta
(74) *Attorney, Agent, or Firm* — Adrian L. Pishko

(57) ABSTRACT

Article having a first single, discrete atomic, dry layer of a first weakly bonded crystalline material on at least a surface of a substrate. Embodiments of the articles are useful, for example, in automotive under-the-hood parts exposed to chemicals and extreme temperatures.

9 Claims, 1 Drawing Sheet

(51) Int. Cl.
*C01B 31/04* (2006.01)
*B82Y 30/00* (2011.01)

(56) References Cited

U.S. PATENT DOCUMENTS

| | | | |
|---|---|---|---|
| 6,874,699 | B2 | 4/2005 | Larson |
| 2003/0129305 | A1 | 7/2003 | Wu |
| 2005/0003098 | A1 | 1/2005 | Kohler |
| 2005/0250052 | A1 | 11/2005 | Nguyen |
| 2007/0138405 | A1 | 6/2007 | Shirck |
| 2007/0258743 | A1* | 11/2007 | Shakuto et al. ............... 399/346 |
| 2008/0181689 | A1* | 7/2008 | Fujimori ............ G03G 21/0011 399/346 |
| 2009/0060600 | A1* | 3/2009 | Ninomiya et al. ............ 399/346 |
| 2009/0110627 | A1 | 4/2009 | Choi |
| 2009/0155561 | A1 | 6/2009 | Choi |
| 2009/0200707 | A1 | 8/2009 | Kivioja |
| 2010/0000441 | A1 | 1/2010 | Jang |
| 2010/0127312 | A1 | 5/2010 | Grebel |
| 2010/0140219 | A1 | 6/2010 | Liang |
| 2012/0152739 | A1* | 6/2012 | Moosbrugger et al. .. 204/298.41 |

FOREIGN PATENT DOCUMENTS

| | | | | |
|---|---|---|---|---|
| WO | WO 2009/035647 | A1 * | 3/2009 | ........... G01N 27/414 |
| WO | WO 2009-049375 | | 4/2009 | |
| WO | WO 2009-099707 | | 8/2009 | |
| WO | WO 2009-119641 | | 10/2009 | |

OTHER PUBLICATIONS

Tribology Series, Chapter 14. Other lamellar solid lubricants, vol. 35, 1999, pp. 283-304.*

"Hybrid graphene/silicon substrate comprising embedded regions for graphene detection", An IP.com Prior Art Database Technical Disclosure, IP.Com No. IPCOM000179824D, Feb. 26, 2009, 2 pages.

"Printing Method and Apparatus", An IP.com Prior Art Database Technical Disclosure, IP.Com No. IPCOM000139281D, Aug. 18, 2006, 17 pages.

"Semiconductor Inks for Printed Electronics Manufacturing", An IP.com Prior Art Database Technical Disclosure, IP.Com No. IPCOM000141243D, The American Chemical Society Meeting & Exposition, Atlanta, Georgia, USA, Mar. 26-30, 2006, 29 pages.

Bae S. et al., "Roll-to-roll production of 30-inch grapheme films for transparent electrodes", *Nat. Nanotech.* vol. 132, pp. 1-5, Jun. 2010.

Chason, "Toward Manufacturing Low-Cost, Large-Area Electronics", MRS Bulletin, Jun. 2006, vol. 31, No. 6, pp. 471-475.

Geim, "Carbon Wonderland", Scientific American, Apr. 2008, vol. 298, No. 4, p. 82.

Kim, "Large-Scale Pattern Growth of Graphene Films for Stretchable Transparent Electrodes", Nature, Feb. 5, 2009, vol. 457, pp. 706-710.

Lee, "Wafer Scale Synthesis and Transfer of graphene films", American Chemical Society, Nano Letters, 2010, vol. 10, No. 2, pp. 490-493.

Moore, "Stress Recrystallization of Pyrolytic Graphite", Proc. R. Soc. Lond., 1964, vol. 280, No. 1381, pp. 153-169.

International Search Report for International Application No. PCT/US2011/063064, mailed on Jun. 27, 2012, 4 pages.

Novoselov, et al., "Two-dimensional atomic crystals," Proceedings of the National Academy of Sciences of the United States of America, vol. 102, No. 30, Jul. 26, 2005, pp. 10451-10453.

Supplementary European Search Report, EP Application No. 11846563, dated Oct. 17, 2014, 3 pages.

* cited by examiner

ARTICLE AND METHOD OF MAKING AND USING THE SAME

CROSS REFERENCE TO RELATED APPLICATION

This application claims the benefit of U.S. Provisional Patent Application No. 61/421,017, filed Dec. 8, 2010, the disclosure of which is incorporated by reference herein in its entirety

BACKGROUND

Graphene, a single atomic layer of carbon, is known in the art. Sometimes even several layers of graphene may be referred to in the art as graphene. Two-dimensional (2D) structured carbon sheets of graphene can provide the basic building blocks for carbon allotropes of graphite (a three-dimensional (3D) material), nanotubes (a one-dimensional (1D) material), and fullerenes (a zero-dimensional (0D) material). Graphene is predicted to have exceptional properties such as large thermal conductivity, superior mechanical properties, and excellent electronic transport properties. Although not wanting to be bound by theory, it is believed that electrons in graphene follow a linear dispersion relationship, and behave like mass-less relativistic particles.

Currently, production or growth of graphene films evolves around mechanical exfoliation (e.g., obtaining graphene by physically peeling off the surface layers of graphite using adhesive (e.g., transparent) tape (such as that available under the trade designation "MAGIC TAPE" from 3M Company, St. Paul, Minn.)), chemical exfoliation, and epitaxial growth methods (e.g., chemical vapor deposition (CVD) and plasma enhanced chemical vapor deposition). These techniques require a liquid, adhesive or gaseous vapor inside a high temperature apparatus to deposit the graphene or graphitic thin films onto substrates. Further, these techniques are not able to produce and process graphene with good repeatability.

Further, these methods of providing graphene also leave contaminates deposited at the molecular level. For example, depositing thin molecular layers via Langmuir-Blodgett (LB), layer-by-layer (LBL) deposition uses liquids which contaminate the deposit at the molecular level. Energy intensive methods such as chemical vapour deposition (CVD) and molecular beam epitaxy (MBE) utilize another substrate to deposit a layer of the material of interested which is subsequently transferred to a substrate of interest. In doing so, apart from the complication of the work flow, extraneous materials (e.g., catalyst and, substrate molecules) are incorporated into the deposit. These residual contaminants have to be cleaned by an additional step to obtain pristine deposits.

Most often Applicants have seen the adhesive tape approach referred to in the published work on graphene. The yield of the exfoliated graphene with this technique is relatively low, typically one 100 squared micrometer flake over a 100 $mm^2$ substrate. Adding to the challenge, un-exfoliated graphite on the substrate tends to hinder the fabrication/patterning of metal contacts by short circuiting the device. Thus far, the most feasible way to study graphene is by using e-beam writer for device fabrication. Even though e-beam writing allows novel patterns and circuitry to be fabricated, the technique is tedious and different layout designs are needed for each substrate. This is currently a bottleneck of bringing graphene research to the mainstream materials science community.

Furthermore, it is still a challenge to selectively place the graphene as desired, which is important, for example, in device fabrication and system integration. Further, graphene and its electrical performance is very sensitive to substrate surfaces and the environment, including contaminants. Alternative, more useful forms (e.g., sizes) of graphene and methods for providing those forms and placing them on surfaces is desired.

SUMMARY

In one aspect, the present disclosure describes an article having a single, discrete atomic dry layer of a first weakly bonded crystalline material (e.g., graphite or $MoS_2$) on at least a surface (e.g., a major surface) of a substrate.

In another aspect, the present disclosure provides a method of providing weakly bonded crystalline material onto a substrate, the method comprising transferring at least a portion of a first single, discrete atomic, dry layer of a first weakly bonded crystalline material onto a surface (e.g., a major surface) of a substrate.

In another aspect, the present disclosure describes a printer (e.g., an ink jet printer) comprising a first print head with a print surface comprising dry, weakly bonded crystalline material. Optionally, the printer further comprises a second or more print head with a print surface comprising dry, weakly bonded crystalline material which may the same or different than the dry, weakly bonded crystalline material of another print head.

In this application:

"dry" is meant to indicate that the weakly bonded crystalline material (including graphite) is in the solid state and is not dispersed in a liquid or gaseous medium. It is known that some weakly bonded crystalline materials may adsorb large amounts of (approaching 75 volume % or higher) various species such as moisture, from the environment during preparation and handling. Within the context of this application weakly bonded materials comprising up to 75 volume % of adsorbed species are considered "dry".

"weakly bonded" refers to Van der Waals forces (e.g., dipolar forces, intermolecular forces, electrostatic forces, induction forces, dispersive forces, repulsive forces, and combinations thereof).

Optionally, the article further comprises a second single, discrete atomic layer of weakly bonded crystalline material on at least a portion of at least one of the major surface of the substrate or the first weakly bonded crystalline material. Optionally, the article further comprises a third single, discrete atomic layer of weakly bonded crystalline material on at least a portion of at least one of the major surface of the substrate, first weakly bonded crystalline material, or the second weakly bonded crystalline material. Optionally, the article further comprises additional single, discrete atomic layers of weakly bonded crystalline material on at least a portion of at least one of the major surface of the substrate or the other weakly bonded crystalline materials.

Advantages of methods described herein for making articles described herein is the ability to transferring at least a portion of a layer of a first weakly bonded crystalline material onto a surface wherein the layer is in a dry state and further to do so with a single, discrete atomic layer. By contrast, for example, conventional digital printing, for example, employs inks to deposit materials (e.g., pigments) by suspending the material in a medium (e.g., water and/or organic solvent).

Articles described here are useful, for example, in automotive under-the-hood parts exposed to chemicals and extreme temperatures. Graphene composites tend to exhibit reduced solvent swelling, reduced electrostatic dissipation, lower coefficient of thermal expansion (CTE), and improved heat dissipation, preventing hot-spots that might cause polymer degradation as opposed to graphene composites made by conventional chemical synthesis techniques. The articles may also be useful in composite applications such as fuel systems that require both high barrier and electrical conductivity, electrostatic dissipative (ESD) packaging for electronics, electromagnetic and radio frequency interference (EMI/RFI) shielding in electronic enclosures, and parts that can be electrostatically painted. Graphene coatings provided herein may also be a good indium tin oxide (ITO) replacement for numerous applications such as solar cells, and as a material for thermal management due to its relatively high thermal conductivity.

DETAILED DESCRIPTION

Figure 1:
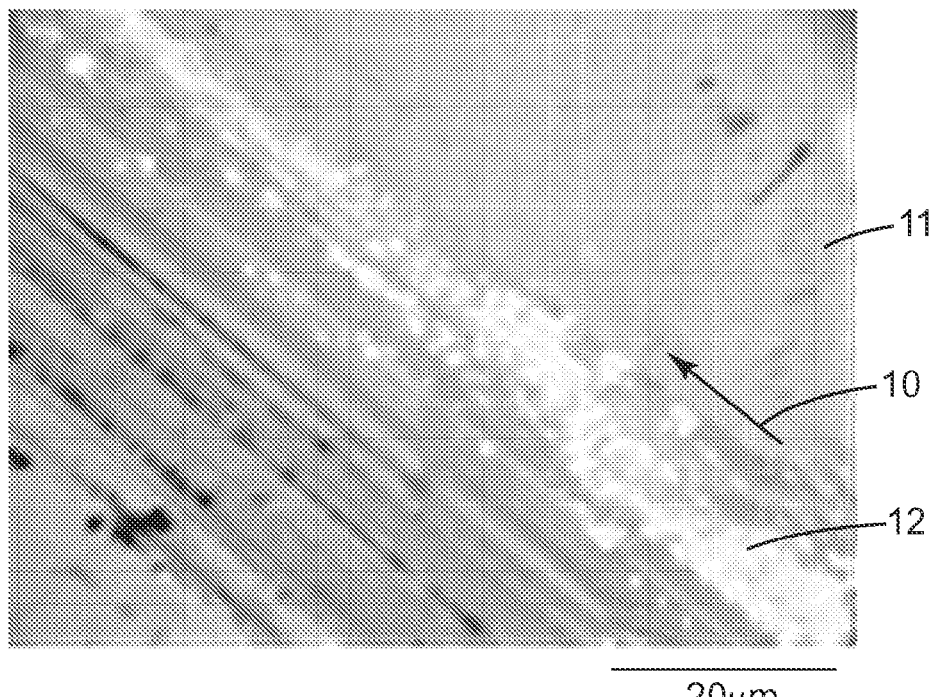
FIG. 1 is an optical photomicrograph at of graphitic material transferred onto a plastic substrate.

Exemplary weakly bonded crystalline materials include graphite, mica, clay, hexagnonal boron nitride, and transition metal dichalcogenides having the formula $MX_2$, where M=Mo, W, Nb, Ta; and X=S, Se, and Te. For embodiments, having more than one weakly bonded crystalline layer, at least two of the weakly bonded crystalline materials may be the same or different.

Graphene is a single sheet of planar hexagons of carbon atoms, each atom connected by three bonds to its neighbors. The sheets are connected with each other by van der Waal's bonding. Bonding forces of graphene are very weak, comparable with these in molecular crystals. Typically, a single layer of graphene is about 0.3-0.4 nm thick.

Graphene is known in the art and can be provided, for example, from highly ordered pyrolytic graphite or highly oriented pyrolytic graphite (HOPG). HOPG refers to graphite with an angular spread between the graphite sheets of less than 1 degree. HOPG is graphite typically formed by thermal cracking of a hydrocarbon gas and annealing the deposit under pressure. The final material consists of crystallites well oriented along the c-axis (perpendicular to the basal graphite planes) but oriented at random around this axis. Some preferred embodiments of HOPG can be provided as described in A. W. Moore. A. R. Ubbelohde and D. A. Youne, *Proc. Roy So*, (London) 280, 153 (1964), the disclosure of which is incorporated herein by reference, wherein the process for making HOPG includes stress-annealing process at about 3400° C.

Exemplary substrates and surface thereof include those comprising polymer (e.g., polyethylene terephthalate (PET), polyimide, polymethyl methacrylate (PMMA), polypropylene (PP), and polyethylene (PE)), including polymer films; metals (e.g., aluminium, copper, gold, and nickel); ceramics (including glass, crystalline ceramic, and glass-ceramic); and semiconductors.

The substrates can be planar or non-planar surfaces, either rigid or flexible. In some embodiments, the planar surfaces can be modified to exhibit better substrate selectivity to control adhesion. Exemplary surface modifications include polymers with primers present on the surface (e.g., as that available, for example, under the trade designation "DUPONT MELINEX 618 PRIMED PET" from DuPont Teijin Films, Hopewell, Va.), polymers with plasma (see, e.g., U.S. Pat. No. 5,389,195 (Ouderkirk et. al) and U.S. Pat. Doc. No. 20050003098 (Kohler, et. al.), or corona surface treatments (see, e.g., U.S. Pat. No. 5,972,176 (Kirk et. al.) or PCT Pub. No. WO 01/176770 (Louks, et. al.), published Oct. 18, 2001).

In some embodiments, the surfaces of the substrates can be structured in different geometries, using conventional lithography and imprinting techniques. For example, lithography processes can be used to provide geometries such as regular arrays of straight lines, squares, circles etc, on substrates such as metals, semiconductors, crystalline ceramics, glass, glass-ceramics, ferroelectrics etc. Dimensions of the geometries may vary, for example, from micrometer to nanoscale.

In some embodiments, the surface of the substrate is roughened. Exemplary substrates with roughened surfaces include those available, for example, under the trade designations "3M VIKUITY BEF III 90/50 BRIGHTNESS ENHANCEMENT FILM," "3M VIKUITY DBEF-M DUAL BRIGHTNESS ENHANCEMENT FILM," and "3M VIKUITY ARMR-200 MA FI E ANTIREFLECTIVE FILM" from 3M Company, and films roughened via etching (see, e.g., U.S. Pat. Doc. No. 20070138405 (Shirck, et. al.)).

Optionally, the size and shape of the substrates can be tailored to be accommodated onto a roll-to-roll system.

Articles described herein can be made, for example, by the method described above, wherein the method comprises transferring at least a portion of a first single, discrete atomic, dry layer of a first weakly bonded crystalline material onto a surface of a substrate. Optionally, a second single, discrete atomic layer of weakly bonded crystalline material on at least a portion of at least one of the major surface of the substrate or the first weakly bonded crystalline material. Optionally, a third single, discrete atomic layer of weakly bonded crystalline material on at least a portion of at least one of the major surface of the substrate, first weakly bonded crystalline material, or the second weakly bonded crystalline material. Optionally, additional single, discrete atomic layers (a fourth, fifth, six, seven, etc.) of weakly bonded crystalline material on at least a portion of at least one of the major surface of the substrate or the other weakly bonded crystalline materials can be provided.

Typically, the first weakly bonded crystalline material is in the form of a pattern. In some embodiments, the weakly bonded crystalline material(s) exhibits at least one of an alphanumeric character(s), an image(s) or indicia(s) (which may be, for example, a trademark or copyrighted material, including a registered trademark or registered copyright as defined under any of the countries, territories, etc. of the world (including the United States))

Articles described herein can be provided by providing weakly bonded crystalline material onto a substrate by transferring at least a portion of a single, discrete atomic, dry layer of a weakly bonded crystalline material onto a surface (e.g., a major surface) of a substrate. The source of weakly bonded crystalline material is a multi-layered form of the graphene, mica, clay, hexagonal boron nitride, and transition metal dichalcogenides materials.

Equipment for facilitating the transfer the weakly bonded crystalline material includes conventional ink jet printers (available, for example, from Hewlett-Packard, Palo Alto, Calif. under the trade designation "HP DESKJET" (e.g., "HP DESKJET 948C")), wherein the multi-layered material is used in place of an ink cartridge or is mounted on an ink cartridge so as to replace the ink. Such equipment allows for control of the transfer direction, transfer force, transfer speed, transfer temperature, and transfer pattern. This approach can be accomplished without the use of liquid media, which in turn allows for depositing molecularly clean (free of contaminants) layers the material as opposed to conventional wet chemical and/or vacuum techniques.

In some embodiments, the weakly bonded crystalline material to be transferred is attached on to a single fixture in the apparatus for transferring the material, while in others, multiple fixtures may be used that hold the same or different weakly bonded crystalline material(s). The weakly bonded crystalline material can be attached to the fixture, for example, with conventional adhesive such as that available from 3M Company, under the trade designation SCOTCH-WELD INSTANT ADHESIVE (CA100").

In some embodiments, it is possible to control the transferred layer thickness (monolayer, bilayer, etc.) by controlling the contact force. Contact force is defined as the force exerted when two physical objects come in direct contact with each other. In some embodiments, the force can be measured via a load-cell feedback arrangement, which runs in a feedback loop to ascertain the HOPG crystal is grazing the substrate before any transfer could take place.

In some embodiments, the relative speed (the distance traveled per unit time or the rate of measure of motion) of the weakly bonded crystalline material to be transferred or the substrate is controlled. It is desirable in some embodiments that the ink jet printer has a maximum speed for transferring graphene materials on any substrate along the X- and Y-axes of, for example, 700 mm/second), and along the Z-axis 250 mm/seconds, wherein the combined speed is typically 500 mm/seconds.

In some embodiments, the exact position at which the graphene is transferred is particularly important for the intended application, and may require controlling the transfer of the weakly bonded crystalline material at a defined location on a substrate along the x, v coordinates. Such applications may include, for example, electronic circuitry interconnects, contact electrode deposition, and where multiple single, discrete layers are provided. It is desirable in some embodiments that the ink jet printer has, for example, a range for each of the x- and y-axes of 200 mm, and for the Z axis a range of 50 mm. It is desirable in some embodiments that the ink jet printer has, for example, repeatability along all 3 of at least +/−6 micrometers. It is desirable in some embodiments that the ink jet printer has, resolution along each of the x- and y-axes of at least 5 micrometers, and for the z-axis at least 2.5 micrometers.

In some embodiments, the temperature of the substrate and the process temperature may be important for the better adhesion of the materials transferred onto the substrate. For example, in some embodiments, for example, for plastic, glass, metals, and semiconductor substrates), it may be desired to control the temperature in a range from about 25° C. (room temperature) to about 350° C., and, for example, for ceramics and other relatively high temperature substrates, in a range from about 25° C. (room temperature) to about 500° C.

Uniform patterns can be obtained, for example, by applying a force between the weakly bonded crystalline material and the substrate and monitoring the frictional force experienced by the weakly bonded crystalline material using a force sensor. By modulating the applied force on the weakly bonded crystalline material according to the frictional force experienced by it with a feed-back system, the transfer morphology can be controlled.

In some embodiments, a single, discrete atomic dry layer of a weakly bonded crystalline material has a continuous area in a range from 50 nanometers×30 nanometers to 50 micrometers×20 micrometers.

In some embodiments, the layer of weakly bonded crystalline material is optically transparent. If there is more than one layer of weakly bonded crystalline material, at least one layer may be optically transparent, while at least one may not be.

In some embodiments, the layer of weakly bonded crystalline material has a thermal conductivity' of, for example, in a range from about 25 W/m·K to about 470 W/m·K, wherein it is understood that in this context the value is of the bulk material. If there is more than one layer of weakly bonded crystalline material, at least one layer may have, for example, a thermal conductivity in a range from about $4.8 \times 10^3$ W/m·K to about $5.3 \times 10^3$ W/m·K, while at least one may not be.

In some embodiments, the layer weakly bonded crystalline material has, for example, an electrical conductivity in a range from about $4.5 \times 10^3$ $ohm^{-1}m^{-1}$ to about $6.5 \times 10^3$ $ohm^{-1}m^{-1}$, wherein it is understood that in this context the value is of the bulk material. If there is more than one layer of weakly bonded crystalline material, at least one layer may have an electrical conductivity of at least about $10^3$ $ohm^{-1}m^{-1}$, while at least one may not be.

Articles described here are useful, for example, in automotive under-the-hood parts exposed to chemicals and extreme temperatures. Graphene composites tend to exhibit reduced solvent swelling, reduced electrostatic dissipation, lower coefficient of thermal expansion (CTE), and improved heat dissipation, preventing hot-spots that might cause polymer degradation as opposed to as to graphene composites made by conventional chemical synthesis techniques. The articles may also be useful in composite applications such as fuel systems that require both high barrier and electrical conductivity, electrostatic dissipative (ESD) packaging for electronics, electromagnetic and radio frequency interference (EMI/RFI) shielding in electronic enclosures, and parts that can be electrostatically painted. Graphene coatings provided herein may also be a good indium tin oxide (ITO) replacement for numerous applications such as solar cells, and as a material for thermal management due to its relatively high thermal conductivity.

The transfer method described herein also addresses this technique for printed electronic devices the so called "printed electronics" which may be in the form of complete devices, parts or sub-sets of devices, electronic components etc. Its desirable by this technique to put circuitry at precise locations on a substrate, make inter-connections between devices, make electrical contacts and electrodes. The substrates can either be with variably degree of transparency. The "dry" transfer technique described herein can overcome problems such as sintering or curing usually done with metal based ink printing for printed electronics.

Exemplary Embodiments

1. A method of providing weakly bonded crystalline material onto a substrate, the method comprising transferring at least a portion of a first single, discrete atomic, dry layer of a first weakly bonded crystalline material onto a surface of a substrate.

2. The method of Embodiment 1, wherein the first weakly bonded crystalline material is transferred onto the major surface of the substrate in a pattern.

3. The method of either Embodiment 1 or 2, wherein the first weakly bonded crystalline material is transferred onto the surface of the substrate exhibits a first image.

4. The method of any preceding Embodiment, wherein the first weakly bonded crystalline material is transferred onto the surface of the substrate exhibits at least one alphanumeric.

5. The method of any preceding Embodiment, wherein the first weakly bonded crystalline material is transferred onto the surface of the substrate exhibits at least one of a first trademark indicia or a first copyrighted indicia.

6. The method of any preceding Embodiment, wherein the first weakly bonded crystalline material is selected from the group consisting of graphite, mica, clay, hexagonal boron nitride, and transition metal dichalcogenides having the formula $MX_2$, where M=Mo, W, Nb, Ta; and X=S, Se and Te.

7. The method of any of Embodiments 1 to 5, wherein the first single, discrete atomic, thy layer of a first weakly bonded crystalline material is graphene.

8. The method of any preceding Embodiment, wherein the surface of the substrate is structured.

9. The method of any preceding Embodiment, further comprising transferring at least a portion of a second single, discrete atomic, dry layer of a second weakly bonded crystalline material onto at least a portion of at least one of the major surface of the substrate or the first weakly bonded crystalline material.

10. The method of Embodiment 9, wherein the second weakly bonded crystalline material is selected from the group consisting of graphite, mica, clay, hexagonal boron nitride, and transition metal dichalcogenides having the formula $MX_2$, where M=Mo, W, Nb, Ta; and X=S, Se, and Te, 11. The method of either Embodiment 9 or 10, wherein the first and second weakly bonded crystalline material are the same material.

12. The method of either Embodiment 9 or 10, wherein the first and second weakly bonded crystalline material are different materials.

13. The method any of Embodiment 9 to 12, wherein the first single, discrete atomic, dry layer of a second weakly bonded crystalline material is graphene.

14. The method of any of Embodiments 9 to 13 further comprising transferring at least a portion of a third single, discrete atomic, thy layer of a third weakly bonded crystalline material onto at least a portion of at least one of the surface of the substrate, the first weakly bonded crystalline material or the second weakly bonded crystalline material.

15. An article having a first, discrete single atomic, dry layer of a first weakly bonded crystalline material on at least a surface of a substrate.

16. The article of Embodiment 15, wherein the first weakly bonded crystalline material is in the form of a pattern.

17. The article of either Embodiment 15 or 16, wherein the first weakly bonded crystalline material exhibits a first image.

18. The method of any of Embodiments 15 to 17, wherein the first weakly bonded crystalline material is transferred onto the surface of the substrate exhibits at least one alphanumeric.

19. The article of any of Embodiments 15 to 18, wherein the first weakly bonded crystalline material exhibits at least one of a first trademark indicia or a first copyrighted indicia.

20. The article of any of Embodiments 15 to 19, wherein the first weakly bonded crystalline material is selected from the group consisting of graphite, mica, clay, hexagonal boron nitride, and transition metal dichalcogenides having the formula $MX_2$, where M=Mo, W, Nb, Ta; and X=S, Se, and Te.

21. The method any of Embodiment 15 to 20, wherein the first single, discrete atomic, dry layer of a first weakly bonded crystalline material is graphene.

22. The article of any of Embodiments 15 to 21, wherein the surface of the substrate is structured.

23. The article of any of Embodiments 15 to 22, wherein the first weakly bonded crystalline material is optical transparent.

24. The article of any of Embodiments 15 to 23, further comprising a second, discrete single atomic, dry layer of weakly bonded crystalline material on at least a portion of at least one of the major surface of the substrate or the first weakly bonded crystalline material.

25. The article of Embodiment 24, wherein the second weakly bonded crystalline material is selected from the group consisting of graphite, mica, clay, hexagonal boron nitride, and transition metal dichalcogenides having the formula $MX_2$, where M=Mo, W, Nb, Ta; and X=S, Se, and Te.

26. The article of either Embodiment 24 or 25, wherein the first and second weakly bonded crystalline material are the same material.

27. The article of either Embodiment 24 or 25, wherein the first and second weakly bonded crystalline material are different materials.

28. The article of any of Embodiments 24 to 27, further comprising a third, discrete single atomic, dry layer of weakly bonded crystalline material onto at least a portion of at least one of the major surface of the substrate, the first weakly bonded crystalline material or the second weakly bonded crystalline material.

29. A printer comprising a first print head with a print surface comprising dry, weakly bonded crystalline material.

30. The printer of Embodiment 30 that is an ink jet printer.

31. The printer of either Embodiment 30 or 31, wherein the dry, weakly bonded crystalline material is selected from the group consisting of graphite, mica, clay, hexagonal boron nitride, and transition metal dichalcogenides having the formula $MX_2$, where M=Mo, W, Nb, Ta; and X=S, Se, and Te.

32. The printer of any of Embodiments 30 to 31 further comprising a second print head with a print surface comprising dry, weakly bonded crystalline material.

33. The printer of Embodiment 32, wherein the dry, weakly bonded crystalline material of the second print head is selected from the group consisting of graphite, mica, clay, hexagonal boron nitride, and transition metal dichalcogenides having the formula $MX_2$, where M=Mo, W, Nb, Ta; and X=S, Se, and Te.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Example 1

A modified (as described below) ink jet printer (obtained from Hewlett Packard Company, Palo Alto, Calif. under the trade designation "HP DESKJET 948C") was used for transferring weakly bonded crystalline graphite onto substrates. The ink-jet printer was used with dry cartridges (i.e., the cartridges did not have any ink inside). The weakly bonded crystalline graphite (a 10 mm×10 mm×1 mm sample of highly oriented pyrolitic graphite crystal obtained from SPI Supplies, West Chester, Pa.) was attached onto the printing heads of the cartridges using an adhesive (obtained from 3M Company, St. Paul, Minn. under the trade designation "SCOTCH-WELD INSTANT ADHESIVE CA100"). The substrate was a 0.1 mm thick A4 sized transparency film (obtained under the trade designation "PVC 7204" from LAV Visual Products, Singapore), which was introduced in the paper slot of the printer. When the substrate was pulled into the print area by the rollers, the weakly bonded crystalline graphite and substrate were in close proximity with each other. The pattern to be printed was transmitted to the printer via a conventional computer (obtained under the trade designation "HP COMPAQ 6910P" from Hewlett Packard Company). When the printer received the appropriate command, the weakly bonded crystalline graphite and the substrate moved relative to each other, gently rubbing and thus transferring (depositing) layers thin layers of graphene on the substrate. The printed samples included a series of rectangular shapes of varying dimensions aligned in both the x and the y directions. Referring to FIG. 1, substrate 11 is shown with graphene 12 (white areas) printed thereon.

Example 2

Figure 2:
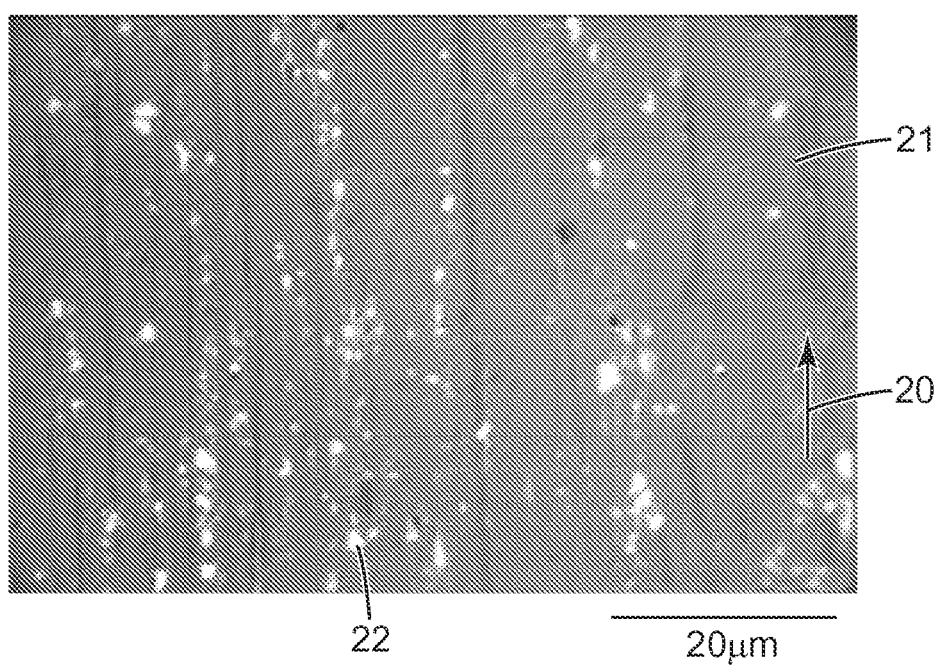
FIG. 2 is an optical photomicrograph image of graphitic material transferred onto a substrate using a pad brush.

Example 2 was carried out in the same manner as Example 1, except in addition to the printer head being fitted with the weakly bonded crystalline graphite, a second printing head was fitted with a paint pad (obtained under the trade designation "SHUR-LINE PAINT PAD" from Shur-Line, Huntersville, N.C.). The paint pad was attached to the second printing head using an adhesive ("SCOTCH-WELD INSTANT ADHESIVE CA100"). The first printer head carrying the weakly bonded crystalline graphite transferred thin layers of graphene when it was in close with the substrate proximity (i.e., touching or grazing the substrate). During this process the second printer head carrying the paint pad brushes facilitated making the graphite thin and spreading the material onto other untransferred areas on the substrate. Referring to FIG. 2, substrate 21 is shown with graphene 22 (white areas) printed thereon.

Foreseeable modifications and alterations of this disclosure will be apparent to those skilled in the art without departing from the scope and spirit of this invention. This invention should not be restricted to the embodiments that are set forth in this application for illustrative purposes.

The invention claimed is:

1. A method of providing weakly bonded crystalline material onto a substrate, the method comprising transferring at least a portion of a first single, discrete atomic, dry layer of a first weakly bonded crystalline material onto a surface of a substrate using a printer comprising a first print head with a print surface comprising the dry, weakly bonded crystalline material, wherein the first single, discrete atomic, dry layer of a first weakly bonded crystalline material is graphene, wherein the transferring comprises rubbing the substrate with the weakly bonded crystalline material.

2. The method of claim 1, wherein the first weakly bonded crystalline material transferred onto the surface of the substrate exhibits at least one alphanumeric character.

3. The method of claim 1, further comprising transferring at least a portion of a second single, discrete atomic, dry layer of a second weakly bonded crystalline material onto at least a portion of at least one of the major surface of the substrate or the first weakly bonded crystalline material.

4. The method of claim 3, wherein the first and second weakly bonded crystalline material are different materials.

5. The method of claim 1, wherein the first weakly bonded crystalline material transferred onto the surface of the substrate exhibits at least one of a first trademark indicia or a first copyrighted indicia.

6. The method of claim 1, wherein the first weakly bonded crystalline material is transferred along an X-axis and a Y-axis of the substrate, wherein a relative speed of the transferring of the first weakly bonded crystalline material is controlled, comprising a maximum speed along each of the X-axis and the Y-axis of 700 millimeters per second (mm/s).

7. The method of claim 1, wherein a process temperature of the transferring of the first weakly bonded crystalline material is controlled to be in a range from about 25° C. to about 500° C.

8. The method of claim 1, wherein the transferring is controlled by modulating an applied force of the rubbing.

9. The method of claim 8, wherein a uniform pattern of the first weakly bonded crystalline material is obtained by modulating the applied force on the first weakly bonded crystalline material with a feed-back system.

* * * * *